J. GRAVES.
CAN HEADING TOOL.
APPLICATION FILED SEPT. 4, 1918.
1,324,447.
Patented Dec. 9, 1919.
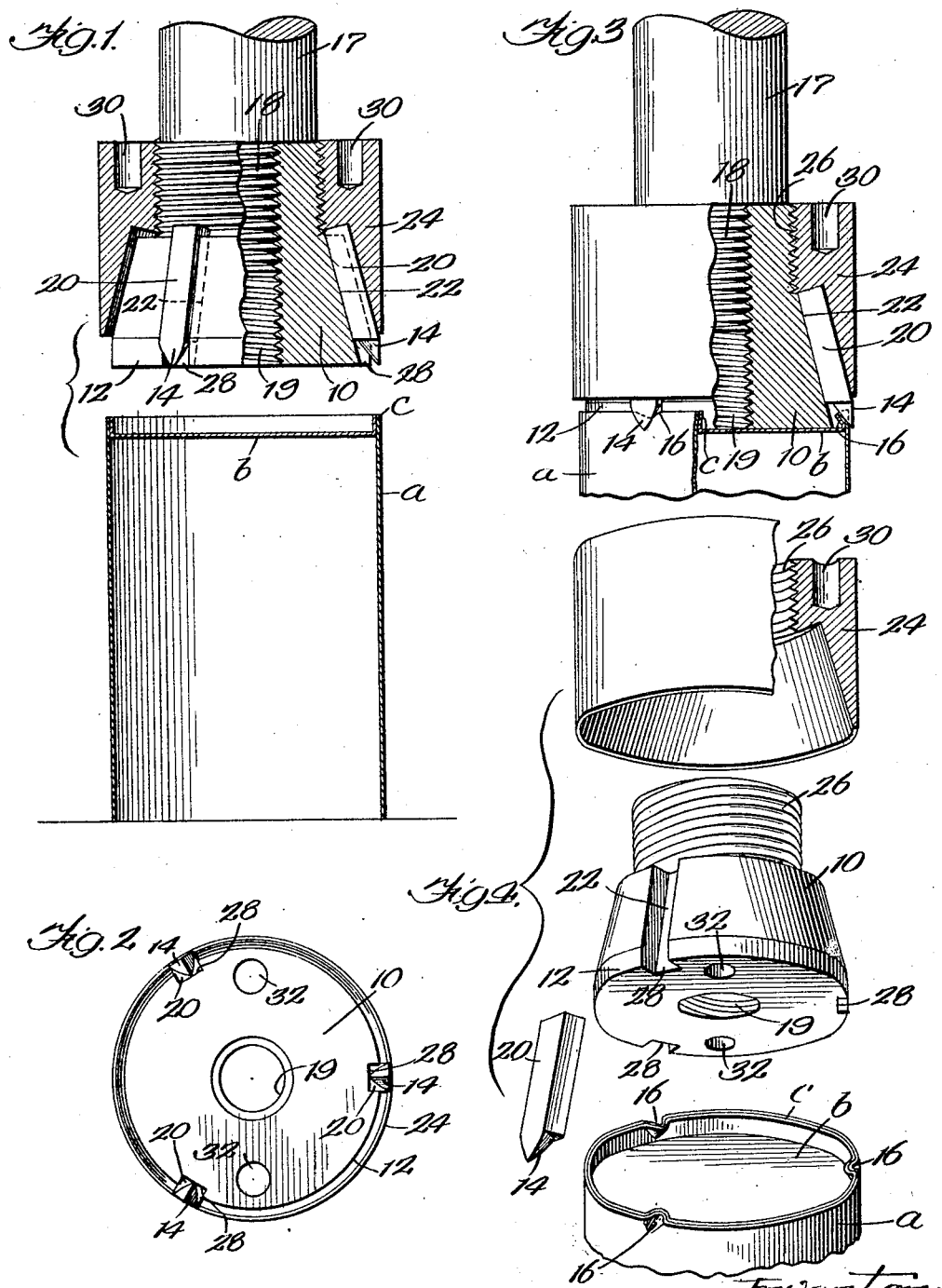

UNITED STATES PATENT OFFICE.

JOHN GRAVES, OF MADISON, WISCONSIN, ASSIGNOR TO FRENCH BATTERY & CARBON CO., OF MADISON, WISCONSIN, A CORPORATION OF WISCONSIN.

CAN-HEADING TOOL.

1,324,447.        Specification of Letters Patent.        Patented Dec. 9, 1919.

Application filed September 4, 1918. Serial No. 252,517.

*To all whom it may concern:*

Be it known that I, JOHN GRAVES, a citizen of the United States, residing at Madison, in the county of Dane and State of Wisconsin, have invented a certain new and useful Improvement in Can-Heading Tools, of which the following is a specification.

It has long been the practice to make cans out of a tubular metallic member $a$, by placing therein a flanged head $b$; either by hand or by an automatic machine; preparatory to soldering the two together along or over their line of contact $c$, but the difficulty has been to insure the parts staying in said assembled position preparatory to and during the soldering operation prior to the time the solder takes hold to firmly secure them in place. One reason for this lies in the fact that due to various reasons, cans are quite apt to be received at the heading machine a trifle undersize. Whenever this is the case and the bottom is inserted, the wall of the can is somewhat tapered or bell-shaped. This being the case the bottoms have a tendency to spring out or warp when they come in contact with hot solder, due principally to the expansion of the can tube while in the heat. The object of this invention is to provide a tool which will, working with the assembling tool or otherwise, so bend the parts as to hold them together pending and during the soldering operation. The invention consists in the mechanism capable of accomplishing the foregoing objects, which can easily and cheaply be made, which is satisfactory in operation and is not readily liable to get out of order. More particularly, the invention consists in the features and details of construction which will be hereafter more fully set forth in the specification and claims.

Referring to the drawings, in which similar numerals represent the same parts throughout the several views, Figure 1 is a side view partially in section, of mechanism illustrating this invention in its preferred form, the working tool being shown separated from the can and head on which it is to work.

Fig. 2 is an inverted plan view of the operating tool.

Fig. 3 is a view similar to that of Fig. 1, showing the operating tool at work in conjunction with the can.

Fig. 4 is a view showing the various parts of the working tool disassembled.

Broadly speaking, the can heading tool of this invention consists of a die member 10, whose lower edge or flange 12 is adapted to engage a suitably placed can head $b$ for the purpose of driving it to the finished position shown in the figures, said die member 10 being equipped around its outer circumference with bending members or teeth 14, suitably arranged and shaped so that as the die member moves into operative position with refernce to the can $a$ indentations or notches 16 are formed in the combined can head flange and can body proper as clearly appears in Fig. 4, thus frictionally holding the can parts together.

In the particular details adopted for illustrating the invention in the drawings, the die member 10 is supported on the vertically reciprocatable plunger 17 attached to and driven by an ordinary can heading machine (not shown) through the agency of a central screw member 18, engaging suitable screw threads 19 on the inside of member 10. The teeth 14, heretofore referred to, are formed on the ends of slidable blocks 20, detachably insertible in suitable recesses 22 formed in the circumference of member 10. These blocks 20 are held in place and the whole device is given a finished appearance through the cylindrical cap 24, screw threaded onto the outside of die member 10 through the agency of screw threads 26.

The tool, heretofore described, may be used either as one carrying the can head $b$ on the end 12 of the die 10 into the can $a$ and in so doing simultaneously forming the can and notches 16, in the manner described, or it may be used in forming the notches 16 only on a can whose head $b$ has been previously placed in position within the can body $a$.

It is to be noted, as clearly shown in Fig. 2, that the bottom ends of the recesses 22 form the rectangular notches 28 at points adjacent to the effective portions of teeth 14 so as to allow for the proper operation of the tool when used to carry a can head $b$ into place and to simultaneously form the bends 16 and then permit the withdrawal of the tool from the completely formed can as shown in Fig. 4. That is to say, these notches 28 are of a suitable size to clear the inner surfaces of the indentations 16 as the complete tool is withdrawn from the finished work.

In the operation of the complete device, the can heads *b* are either placed in the can body *a* as shown in Fig. 1 and the tool allowed to descend upon it, or the can body *a* is set up and the tool is used to carry the cover *b* into place. In either case as the tool descends in front of the can, teeth 14 form the indentations 16 for the purposes set forth, after which the tool is removed and the finished product is treated by solder or otherwise, as the operator may desire.

Wrench holes 30 are provided in member 24 and wrench holes 32 are provided in member 10 to facilitate rotating them on the respective screw threads on which they are mounted, as heretofore described.

Having thus described my invention, what I claim as new and desire to secure by Letters Patent, is:—

1. A tool for securing the ends to can bodies comprising a head having a portion engageable within the end of the can body to interiorly support the same, and teeth on the head operating to indent the body during movement of said supporting portion within a can body.

2. A tool for securing flanged ends to can bodies comprising a head having a portion engageable within the can end to interiorly support the flange thereof, and teeth on the head coöperating with the can body during movement of said supporting portion within the flange of the can end to simultaneously indent the can body and end flange.

3. A tool for securing the ends to can bodies comprising a head having a portion engageable within the can body, said portion having spaced surfaces for interiorly supporting the can body, and teeth on the head between said supporting surfaces operating during movement of said supporting surface within a can body to indent the body.

4. A tool for securing flanged ends to can bodies comprising a head having a portion engageable within the can end, said portion having spaced surfaces for interiorly supporting the flange of the end, and teeth on the head between the supporting surfaces coöperating with the can body during movement of the supporting surfaces within said can body to simultaneously indent the body and end flange.

5. A tool for securing ends to can bodies comprising a head engageable within the end of the can body to interiorly support the same, and teeth on the head immovable with respect thereto, and operating to indent the body during movement of the head relatively to a can.

6. A tool for securing flanged ends to can bodies comprising a head engageable within the can end to interiorly support the flange thereof, and teeth on the head immovable with respect thereto and coöperating with the can body during movement of the head relative to the body to simultaneously indent the can body and end flange.

7. A tool for securing ends to can bodies comprising a head engageable within the can body and having spaced surfaces for interiorly supporting the same and teeth on the head between the supporting surfaces immovable with respect to the head and operating to indent the body during movement of the head relatively to a can.

8. A tool for securing flanged ends to can bodies comprising a head engageable within the can end and having spaced surfaces for interiorly supporting the flange of the end, and teeth on the head between the supporting surfaces immovable with respect to the head and coöperating with the can body during movement of the head relatively to the can body to simultaneously indent the body and end flange.

9. A can heading tool comprising a pair of interfitting members one of which has a portion engageable within a can to interiorly support the same, and a plurality of teeth between said members having a fixed relation to the members during the operation of the tool.

10. In a can heading tool comprising a pair of interfitting members, one smaller than the other, and a plurality of normally immovable blocks detachably insertible between said members, each block carrying a tooth projecting from the larger first member outside the smaller first member, the outer surface of the first smaller member being recessed in notches 28 adjacent to said teeth, for the purposes set forth.

In witness whereof, I have hereunto subscribed my name in the presence of two witnesses.

JOHN GRAVES.

Witnesses:
W. S. MARVIN,
P. A. SCOVILL.